March 18, 1958     P. E. FISKE     2,827,197
HERMETICALLY SEALED ELECTRONICS PACKAGE Filed June 27, 1955

INVENTOR.
PAUL E. FISKE
BY

*George E. Pearson*
ATTORNEYS

United States Patent Office 2,827,197
Patented Mar. 18, 1958

2,827,197

HERMETICALLY SEALED ELECTRONICS PACKAGE

Paul E. Fiske, San Diego, Calif.

Application June 27, 1955, Serial No. 518,420

7 Claims. (Cl. 220—50)

(Granted under Title 35, U. S. Code (1952), sec. 266)

The invention described herein may be manufactured and used by or for the Government of the United States of America for governmental purposes without the payment of any royalties thereon or therefor.

This invention relates to a hermetically sealed electronics package and method for sealing the same and more particularly to a method and means for sealing plastic containers and covers with a bonding material which may be removed without damage to the container and cover to permit reentry for purposes of repair and replacement of electronic components within.

Numerous methods of sealing containers have heretofore been used. These require the use of clamps, screws, gaskets, heating, soldering, and cumbersome external apparatus for effecting the seal. Moreover, either the cover or the container may be damaged in breaking the seal for reentry.

The method and means for sealing which comprises the present invention provides for a quick, easy, and effective seal without the use of external apparatus and elaborate equipment. The seal can be broken without damage to the cover or container and they may be resealed numerous times. The container is made with a recessed portion around the top over which is inserted the flanged portion of the cover. An O-ring is inserted between the shoulder on the container and the end of the cover flange, forming a spacing therebetween which is then filled with a liquid plastic. The O-ring prevents seepage of the plastic between the recessed portion and the flange. The seal is broken by cutting with a saw until the sawteeth cut into the O-ring. The O-rings are replaceable and both the cover and container are ready for resealing. Another form comprises filling the spacing with a plurality of turns of wire before filling with liquid plastic. In this form, the wire may be peeled off, breaking out small layers of the plastic with each turn.

It is therefore an object of this invention to provide for an improved method and means for hermetically sealing electronics packages.

Another object is the provision of a sealing method and means for sealing a cover to a container in which the sealing may be broken without injury to the cover, container, or contents.

Still another object is the provision of a sealing method and means for sealing without the use of heating, soldering or use of cumbersome external apparatus.

A further object is the provision of a sealing method and means which quickly, easily, effectively, and inexpensively seals a cover to a container in which the seal may be broken without injury to the cover, container, or contents.

Other objects and many of the attendant advantages of this invention will be readily appreciated as the same becomes better understood by reference to the following detailed description when considered in connection with the accompanying drawings wherein.

Figure 1:
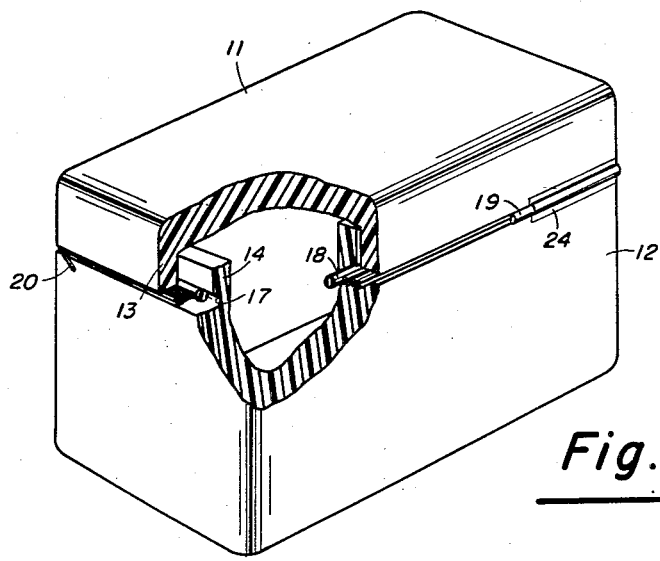
Fig. 1 is a perspective view of a sealed package with parts broken away to more clearly show the seal.

Referring now to the drawings in which like numerals designate like parts throughout the several views, there is shown in Fig. 1 the cover 11 sealed to container 12 which is preferably of the same material. The cover has a downwardly projecting flange 13 which fits over recessed portion 14 around the top of the container. Recessed portion 14 is wider than flange 13, forming a gap 15 between the end of flange 13 and shoulder 16. The base of recessed portion 14 has a further recessed portion or groove 17 into which is inserted an O-ring 18 of such size as to be slightly compressed by flange 13 on the cover to prevent seepage of the seal 19 between recessed portion 14 and flange 13. In the version shown in Fig. 1 a wire 20 is then wrapped around the O-ring 18 several times to loosely fill gap 15. The end of the wire extends from the gap 15 to form a convenient means for unwrapping the wire in unsealing the container 12. The version shown in Fig. 2 does not use the wire 20.

Figure 3:
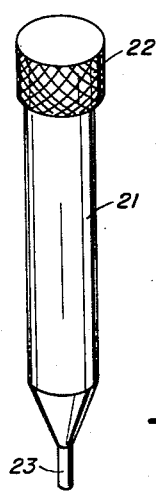
Fig. 3 is a perspective view of the tube of liquid plastic used in completing the seal.

Fig. 3 shows a flexible plastic container 21 filled with a liquid plastic, for example, a polyester resin. Cap 22 is removed and a suitable catalyst is inserted to initiate the polymerization of the liquid. Tip 23 is then broken off to form a small outlet for the liquid which, by hand pressure on the tube 21, is inserted into the gap 15 in both versions shown. After the gap is filled with liquid, masking tape 24 is then placed over it until the liquid has finished polymerization. If the container 12 and cover 11 are not transparent so that the O-ring 18 cannot be seen to define the sealed gap 15 or they are of the same material so that the sealed gap cannot be detected, the liquid plastic solution used may be of a different color, clearly defining the sealed gap. Of course this is not necessary in the version shown in Fig. 1 where the extended portion of wire 20 may be seen and it is necessary only to pull on the extended portion of the wire 20 to successively peel off small layers of the polymerized sealing 19 until the O-ring 18 is exposed and the cover 11 may be lifted easily and readily from the container. In this version the O-ring 18 is undamaged and may be used in resealing the container. It should be understood that the "wire" may be a cord of any suitable material of sufficient strength to be used as a tear-off strip.

Figure 2:
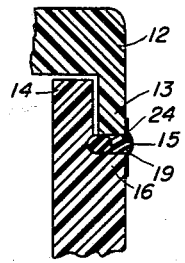
Fig. 2 is a cross-sectional view of a modification of the sealing.

In the version shown in Fig. 2 the seal is broken by cutting along the sealed gap 15 identified by the O-ring 18, contrast in color between cover 11 and container 12, the contrasting colored seal 19, or the tape 24 if it has not previously been removed. This cut can best be made with a saw and the cut is continued until the sawteeth cut into the O-ring 18 as evidenced by tiny bits of O-ring material being removed by the sawteeth. The cover 11 may then be removed from the container 12 without damage to either. Upon replacement of a new O-ring the container is then ready for re-sealing.

This type of sealing is especially useful when the container and cover perform other functions which make them too expensive to discard. An example is when printed circuits, embedded shielding or small components are encapsulated within their walls. The shape of the container or the equipment within it are not intended to be a limitation upon the applications to which this invention may be used nor a limitation of the scope of this invention.

Obviously this invention may be used in numerous applications and many modifications will become apparent to one skilled in the art in the light of the above teachings. It is therefore to be understood that within the scope of the appended claims the invention may be practiced otherwise than as specifically described.

What is claimed is:

1. A sealed container comprising a cover with a downwardly projecting flange, a container with a recessed periphery portion adapted to fit within said flange and a shoulder defined by said recessed portion, said recessed periphery portion being wider than said flange to form a gap between the end of said flange and said shoulder, a peripheral groove at the base of said recessed portion immediately adjacent said gap, a continuous separable member within said groove of such thickness so as to abut said shoulder and the end of said flange at its inner edge, a plastic bonding material disposed within said gap outwardly of said continuous member.

2. A sealed container as in claim 1 wherein said bonding material is transparent to permit location of said gap and said continuous member in opening said container.

3. A sealed container as in claim 1 wherein said bonding material, said cover flange and said container shoulder are all of a transparent material to permit location of said gap and said continuous member.

4. A sealed container as in claim 1 wherein no more than two of the said bonding material, cover flange and container shoulder are of the same color of opaque material.

5. A sealed container as in claim 1, a plurality of turns of loosely wound tear-off strip material filling said gap and extending therefrom, said bonding material filling said gap around said strip material and being formed into small thin layers thereby, said strip material being operable to break out successive layers of said bonding material upon being unwound to thereby expose said continuous member to permit easy removal of said cover.

6. A sealed container as in claim 1 further comprising means for holding said plastic bonding material within said gap during polymerization and for permitting location of said gap and said continuous member in opening said container.

7. A sealed container as in claim 6 wherein said means comprises tape material.

References Cited in the file of this patent

UNITED STATES PATENTS

| | | |
|---|---|---|
| 310,989 | Cooke et al. | Jan. 20, 1885 |
| 1,462,077 | Weston | July 17, 1923 |
| 1,722,324 | Deming | July 30, 1929 |
| 1,993,917 | Byerlein | Mar. 12, 1935 |
| 2,632,211 | Trigg | Mar. 24, 1953 |
| 2,648,454 | Dean | Aug. 11, 1953 |

FOREIGN PATENTS

| | | |
|---|---|---|
| 13,207 | Great Britain | of 1888 |
| 241,159 | Great Britain | Nov. 12, 1925 |